United States Patent Office 2,721,874
Patented Oct. 25, 1955

2,721,874
PURIFICATION OF ALCOHOLS

Arthur McIlroy, Tulsa, Okla., assignor to Stanolind Oil and Gas Company, Tulsa, Okla., a corporation of Delaware No Drawing. Application May 1, 1952,
Serial No. 285,545

8 Claims. (Cl. 260—450)

The present invention relates to the purification of alcohols, and more particularly it pertains to a novel procedure for the removal from said alcohols of contaminants which are oxidizable by permanganate.

It is known that synthetically or biochemically produced alcohols generally possess certain oxidizable contaminants, the last traces of which are substantially impossible to remove even by means of highly efficient fractionating columns. The presence of such contaminants is highly objectionable where alcohols containing these impurities are employed in the preparation of film-forming compositions because of the fact that, on standing, the resulting film tends to discolor. Moreover, these contaminants, under ordinary conditions, oxidize to produce compounds which have a disagreeable odor and which impart undesirable properties to the alcohol. Ethanol containing these oxidizable contaminants is likewise exceedingly undesirable for use as a fortification or blending agent in the manufacture of alcoholic beverages, owing to the characteristic disagreeable odor and flavor which such contaminants impart thereto. Because of the obvious advantages of alcohols which have these undesirable contaminants removed, it has long been the desire of alcohol manufacturers to find an economical and efficient method for accomplishing this object. This is especially true in the case of ethanol where spirit grade alcohol, i. e., ethanol having a permanganate time of at least 45 minutes, commands premium prices.

In U. S. Patent 1,987,601, granted to J. P. Burke, it has been proposed to remove contaminants, such as aldehydes, from alcohols of the type included within the scope of the present invention, for example, by refluxing a mixture of the crude alcohol with an acid salt of a primary amine, such as ethylamine or aniline, so that the amine may react with the aldehydes present, and thereafter recovering a distillate of alcohol having a substantially reduced concentration of aldehydes. While the foregoing procedure may render alcohols suitable for numerous uses, it is wholly ineffective to yield alcohols of the spirit grade variety.

Accordingly, it is an object of my invention to provide a process by which oxidizable impurities of the type normally found in alcohols such as, for example, methanol, ethanol, 1-propanol, isopropyl alcohol, and the like, may be completely removed therefrom by treatment of the contaminated alcohol with a relatively small quantity of a compound having an active methylene group. It is another object of my invention to provide a method for further removing said oxidizable contaminants from alcohols in which the aldehyde concentration thereof may be sufficiently low to give a negative fuchsin test. It is a further object of my invention to provide a method for obtaining high quality spirit grade ethanol by treating solutions of the latter, containing the aforesaid oxidizable contaminants, with said methylene compound and thereafter separating the ethanol in a form sufficiently pure to meet spirit grade ethanol specifications.

The exact nature or structure of the oxidizable contaminants which occur in alcohols is not accurately known. While it has previously been thought that aldehydes may be the principal objectionable impurities contained therein, I have observed that solutions of alcohols which are negative with respect to the standard fuchsin aldehyde test, i. e., alcohols containing less than 5 parts per million of aldehyde, give highly unsatisfactory permanganate times, viz., of the order of 5 to 6 minutes. On the other hand, I have found that alcohols containing as much as from 100 to about 150 parts per million of aldehyde, which is in a range considerably in excess of the aldehyde concentration to which the fuchsin test is negative, still possess satisfactory permanganate times if the undesirable contaminants have been removed. To demonstrate this point, the following example is included.

EXAMPLE I

Ethanol having a permanganate time [1] of 32 minutes was passed through activated charcoal until it gave a permanganate time of 85 minutes. To individual samples of the resulting purified alcohol were separately added varying amounts of acetaldehyde, butyraldehyde and heptaldehyde. The effect of these various aldehydes on the permanganate time of ethanol was then investigated. The results obtained were as follows:

| Aldehyde | Weight Percent Added | Permanganate Time (Minutes) |
|---|---|---|
| Acetaldehyde | 1.485 | 1.0 |
| Do | 0.1485 | 12.0 |
| Do | 0.0742 | 20.0 |
| Do | 0.032 | 28.0 |
| Do | 0.015 | 40.0 |
| Butyraldehyde | 1.02 | 1.0 |
| Do | 0.102 | 14.5 |
| Do | 0.0102 | 50.0 |
| Do | 0.00102 | 73.0 |
| Do | 0.02 | 35.5 |
| Heptaldehyde | 1.0 | 50 (Seconds) |
| Do | 0.1 | 14.0 |
| Do | 0.001 | 69.0 |

[1] The permanganate time test consists of treating a 10 ml. sample of ethanol with 0.4 ml. of 0.02 per cent solution of potassium permanganate at 15° C. The time required for reduction of the permanganate, as evidenced by disappearance of the purple color, is then measured. For spirit grade ethanol, this time should be about 45 minutes.

I have now discovered that any water-soluble alcohol which contains not more than about 150 parts per million of aldehyde, as indicated above, and which contains contaminants oxidizable by permanganate, can be treated in accordance with my invention to obtain a product of high purity and relatively long permanganate time. In carrying out my invention, the contaminated alcohol, particularly dilute aqueous solutions thereof, i. e., containing about 5 to 25 weight per cent alcohol, is treated with a compound containing a reactive methylene group which hereafter may be referred to as "reagent" or "reagents." In accordance with a preferred embodiment of my invention, malonic acid, or any of the other reagents specifically described below, is preferably added as a relatively concentrated aqueous solution to the alcohol to be treated. Thereafter the resulting mixture is distilled to obtain the pure alcohol or an aqueous azeotropic mixture thereof, leaving as a still residue the relatively non-volatile products formed by the interaction of the reagent with the oxidizable contaminants.

While, as previously indicated, the process of my invention is applicable to the improvement in permanganate time of water-soluble alcohols regardless of their source, the process of my invention is particularly adapted to the purification of various water-soluble alcohols obtained by the reduction of carbon monoxide with hydrogen over a fluidized promoted iron catalyst at temperatures of 500° to 700° F. and pressures of from 150 to 450 p. s. i. g. For example, in obtaining the fraction produced by the aforesaid process, the original water layer, which contains the major portion of the ethanol present, is subjected to a series of extractive distillation steps to remove the water-soluble aliphatic acids, acetaldehyde, propionaldehyde, butyraldehyde, acetone, methyl ethyl ketone, methyl propyl ketone, methanol, and isopropyl alcohol. The original water layer, after the aforesaid materials have been separated therefrom, consists essentially of a dilute solution, usually about 5 weight per cent, of ethanol in water. Such a solution is normally negative to the fuchsin aldehyde test, but the ethanol obtained therefrom still is far below the standard required for a beverage or spirit grade alcohol, having a permanganate time usually not greater than 5 or 6 minutes.

The reagents suitable for use in my process are generally defined by the following structural formula, and references in the present disclosure and claims to a compound having a reactive methylene group, or equivalent language, is intended to refer to compounds coming within the scope of said formula:

wherein A and B may represent COOH, a carbalkoxy group of a lower aliphatic alcohol, and $CH_3CO-$; and $n$ is an integer not greater than two. Examples of specific compounds represented by the above formula are malonic and succinic acids, the lower aliphatic alcohol esters of these acids, such as diethyl malonate and diethyl succinate; ethyl acetoacetate, and the like.

Although effective removal of oxidizable contaminants may be accomplished by passing one of the aforesaid reagents directly to the dilute alcohol solution to be purified prior to the distillation step, a substantial saving may be brought about by introducing into the fractionating column a solution of the particular reagent in a suitable concentration at a point above the dilute alcohol feed line, since the concentration of alcohol and contaminants increases markedly on the higher plates in the fractionating column. With dilute ethanol feeds it has been my observation that reagent charged directly to the feed in a concentration of about 100 parts per million is sufficient to effect a complete clean up of oxidizable contaminants. Similar concentrations of these reagents in less dilute ethanol effects the same degree of purification, thus the total amount of reagent required may be decreased.

The quantity of reagent employed in carrying out my process may vary and, in general, depends upon the concentration of the alcohol in the solution to be treated. Thus, with relatively dilute alcoholic solutions, i. e., 5 to 25 weight per cent, the desired reagent may be advantageously employed in concentrations of from about 0.01 to about 0.2 weight per cent. In any event, in order to effect satisfactory removal of all of the undesired oxidizable contaminants in a given solution of impure alcohol, a sufficient quantity of reagent should be added to allow at least about 0.01 to 0.1 weight per cent thereof to dissolve in the solution.

Other materials have previously been employed to obtain alcohols of high purity and good permanganate times. For example, in copending applications U. S. Serial Nos. 117,713 and 117,715, filed September 24, 1949, by Alfred Steitz, Jr., and David K. Barnes, respectively, procedures are described for improving the permanganate time of alcohols by adding thereto a hydrazine or a hydroxylamine compound, distilling the resulting mixture and recovering a purified alcohol as distillate. The materials used in these procedures, however, react with both the saturated aldehydes as well as the oxidizable contaminants present in the alcohol. On the other hand, the reagents employed in accordance with my invention, in addition to being an entirely different class of compounds from those formerly used for this purpose, possess the further advantage that they can remove the undesirable contaminants in the alcohols in the presence of ordinary aldehydes which may appear in concentrations as high as about 150 parts per million. Under such conditions the reagents of my invention do not react with said aldehydes, and, hence, a smaller quantity of reagent is required to remove a given amount of oxidizable contaminant than is necessary when compounds such as hydroxylamine hydrochloride, hydrazine hydrate, and their various derivatives, are employed to treat impure alcohols of identical composition.

The process of my invention may be further illustrated by the following example in which the marked superiority of the aforesaid reagents over aniline and ethylamine is demonstrated.

EXAMPLE II

The aqueous fraction obtained by the synthesis of hydrocarbons from carbon monoxide and hydrogen was first processed to remove essentially all of the ketones, aldehydes, acids and esters. The fraction thus obtained contained about 5 weight per cent ethanol; however, no aldehydes could be detected by test with fuchsin. The solution was divided into four 1200 ml. samples after which aniline hydrochloride and ethylamine hydrochloride were separately added to individual samples, succinic acid in the form of an 85 per cent aqueous solution was added to three of the samples, all in the concentrations listed in the table below. The fourth sample was run as a blank. Each portion was distilled at a reflux ratio of about 40:1, and permanganate time for each 10 ml. of distillate determined. The results obtained are shown below.

TABLE

PERMANGANATE TIMES IN MINUTES

| Cut No. | Control | Weight Percent Ethylamine Hydrochloride, 0.064 | Weight Percent Aniline Hydrochloride, 0.1 | Weight Percent Succinic Acid, 0.05 |
| --- | --- | --- | --- | --- |
| 1 | 0.5 | 7 | 1 | 40 |
| 2 | 0.5 | 12 | 1 | 66 |
| 3 | 0.5 | 19 | 1 | 66 |
| 4 | 0.5 | 10 | 1 | 66 |
| 5 | 0.75 | 4 | 1 | 66 |
| 6 | 1.0 | 2 | 8 | 60 |
| 7 | 2.25 | 1 | 7½ | 66 |
| 8 | 3.0 | | | 65 |
| 9 | 9.0 | | | 57 |
| 10 | | | | 61 |

Ethyl acetoacetate, malonic acid and the ethyl esters of malonic and succinic acids may be substituted in the foregoing example for succinic acid and utilized in concentrations ranging preferably from about 0.06 to about 1.0 weight per cent giving water-soluble alcohols of high purity and good permanganate times. Alcohol obtained as a result of the above treatment contains less than one-half part per million of oxidizable impurities.

From the data appearing in the table, it is evident that both aniline and ethylamine are wholly ineffective to improve the permanganate time of alcohol containing extremely small amounts of oxidizable contaminants. On the other hand, it has been demonstrated that compounds of the type referred to above, containing a reactive methylene group, are very effective in removing the last traces of objectionable oxidizable impurities to give ethanol having a sufficiently high permanganate time to meet the requirements of spirit grade alcohol.

The foregoing examples and description are to be interpreted as being only illustrative of the scope of my invention and are to be in no way regarded as limitative thereof. It will be readily apparent to those skilled in the art that the process described above is susceptible of numerous modifications without departing from the scope of the present invention. Thus, for example, mixtures of alcohols containing oxidizable contaminants may readily be purified by adding thereto any of the aforesaid reagents or mixtures of these compounds and thereafter distilling the resulting mixture to obtain the alcohols free from oxidizable impurities.

What I claim is:

1. A method for improving the permanganate time of a water-soluble alcohol containing up to about 150 parts per million of saturated aldehydes, together with other contaminants oxidizable by permanganate, comprising mixing with the impure alcohol from about 0.01 to about 1.0 weight per cent of a water-soluble compound selected from the group consisting of succinic and malonic acids, the lower aliphatic alcohol esters of these acids and ethyl acetoacetate and thereafter distilling the resulting mixture to obtain said alcohol substantially free from said oxidizable contaminants.

2. The method of claim 1 in which the alcohol being treated was produced by the reduction of carbon monoxide with hydrogen.

3. The method of claim 1 in which the alcohol being treated was produced by the reduction of carbon monoxide with hydrogen, and the reactive methylene compound employed is succinic acid.

4. A method for improving the permanganate time of a water-soluble alcohol which is negative to the fuchsin aldehyde test, but which contains contaminants oxidizable by permanganate, comprising mixing with the impure alcohol from about 0.01 to about 1.0 weight per cent of a water-soluble compound selected from the group consisting of succinic and malonic acids, the lower aliphatic alcohol esters of these acids and ethyl acetoacetate and thereafter distilling the resulting mixture to obtain said alcohol substantially free from said oxidizable contaminants.

5. A method for the preparation of spirit grade ethanol from dilute solutions thereof containing up to about 150 parts per million of saturated aldehydes, together with other contaminants oxidizable by permanganate, which comprises mixing with said solution from about 0.01 to about 1.0 weight per cent of a water-soluble compound selected from the group consisting of succinic and malonic acids, the lower aliphatic alcohol esters of these acids and ethyl acetoacetate and thereafter distilling the resulting mixture to obtain ethanol having a permanganate time of at least 45 minutes.

6. The process of claim 5 in which succinic acid is employed in a concentration of from about 0.01 to about 0.2 weight per cent.

7. A method for the preparation of spirit grade ethanol from dilute solutions thereof, negative to the fuchsin aldehyde test but which contain contaminants oxidizable by permanganate, which comprises mixing with said solution from about 0.01 to about 1.0 weight per cent of a water-soluble compound selected from the group consisting of succinic and malonic acids, the lower aliphatic alcohol esters of these acids and ethyl acetoacetate and thereafter distilling the resulting mixture to obtain ethanol having a permanganate time of at least 45 minutes.

8. The process of claim 7 in which succinic acid is employed in a concentration of from about 0.01 to about 0.2 weight percent.

References Cited in the file of this patent

UNITED STATES PATENTS

| | | |
|---|---|---|
| 736,098 | Highton | Aug. 11, 1903 |
| 2,068,415 | Klipstein | Jan. 19, 1937 |

FOREIGN PATENTS

| | | |
|---|---|---|
| 430,623 | Germany | June 21, 1926 |